United States Patent
Paul et al.

(10) Patent No.: US 7,363,374 B2
(45) Date of Patent: Apr. 22, 2008

(54) METHOD AND SYSTEM FOR FAULT-TOLERANT REMOTE BOOT IN THE PRESENCE OF BOOT SERVER OVERLOAD/FAILURE WITH SELF-THROTTLING BOOT SERVERS

(75) Inventors: Chakkalamattam J. Paul, Austin, TX (US); Bradford A. Stern, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 09/844,398

(22) Filed: Apr. 27, 2001

(65) Prior Publication Data

US 2002/0161868 A1    Oct. 31, 2002

(51) Int. Cl.
*G06F 15/173* (2006.01)
(52) U.S. Cl. ............... 709/226; 709/203; 709/220; 709/222; 709/227; 713/1; 718/104
(58) Field of Classification Search ............ 709/220, 709/221, 222, 223, 226, 227, 201, 203; 713/1, 713/2; 718/104, 105
See application file for complete search history.

(56) References Cited

U.S. PATENT DOCUMENTS

| | | | |
|---|---|---|---|
| 5,974,547 A * | 10/1999 | Klimenko | 709/220 |
| 6,170,008 B1 * | 1/2001 | Bahlmann et al. | 709/220 |
| 6,263,368 B1 * | 7/2001 | Martin | 709/224 |
| 6,393,458 B1 * | 5/2002 | Gigliotti et al. | 709/203 |
| 6,401,121 B1 * | 6/2002 | Yoshida et al. | 709/227 |
| 6,424,654 B1 * | 7/2002 | Daizo | 370/401 |

(Continued)

OTHER PUBLICATIONS

Intel Corp, 'Preboot Execution Environment (PXE) Specification', Sep. 20, 1999, pp. 1-38.*

(Continued)

*Primary Examiner*—Ario Etienne
*Assistant Examiner*—Ramy M Osman
(74) *Attorney, Agent, or Firm*—Duke W. Yee; Jeffrey S. LaBaw; Peter B. Manzo (57) ABSTRACT

A method and system are presented for facilitating a PXE-compliant (Preboot Execution Environment) remote boot process between clients and multiple available servers on a network. Each server device can respond to a PXE-extended DHCP (Dynamic Host Configuration Protocol) Request message from any client device on the network. Each client can receive responses from the alternate servers, select a server from one of those responses, and be directed by that response to complete the remote boot process from the same server. Each server also employs a self-throttling process to prevent the server from responding to new PXE-extended DHCP request messages from additional clients while the server has insufficient resources to remote boot additional clients with the required quality of service. This automatically redirects those additional clients to other servers that can provide the required quality of service without affecting the remote boot of clients already being serviced by the server.

16 Claims, 5 Drawing Sheets

U.S. PATENT DOCUMENTS

| | | |
|---|---|---|
| 6,490,677 B1 * | 12/2002 | Aguilar et al. ............... 713/1 |
| 6,601,096 B1 * | 7/2003 | Lassiter, Jr. ............... 709/222 |
| 6,631,115 B1 * | 10/2003 | Sendelbach et al. ........ 709/203 |
| 6,684,327 B1 * | 1/2004 | Anand et al. ............... 709/222 |
| 6,687,731 B1 * | 2/2004 | Kavak ............... 709/226 |
| 6,687,820 B2 * | 2/2004 | French et al. ............... 709/220 |
| 6,751,658 B1 * | 6/2004 | Haun et al. ............... 709/203 |
| 6,816,963 B1 * | 11/2004 | Krithivas et al. ............... 713/1 |
| 6,871,210 B1 * | 3/2005 | Subramanian ............... 718/105 |
| 6,898,701 B2 * | 5/2005 | French et al. ............... 709/220 |
| 6,928,538 B2 * | 8/2005 | French et al. ............... 713/1 |
| 7,139,816 B2 * | 11/2006 | Anand et al. ............... 709/220 |

OTHER PUBLICATIONS

Microsoft Corp., 'Description of PXE Interaction Among PXE Client, DHCP, and RIS Server', Dec. 29, 1999, online: http//www-w2k.cs.berkeley.edu/admin/docs/docs/Q244036.txt.*

"Preboot Execution Environment (PXE) Specification Version 2.1", Intel Corp., pp. 1-38, Sep. 20, 1999.

* cited by examiner

METHOD AND SYSTEM FOR FAULT-TOLERANT REMOTE BOOT IN THE PRESENCE OF BOOT SERVER OVERLOAD/FAILURE WITH SELF-THROTTLING BOOT SERVERS

BACKGROUND OF THE INVENTION

1. Field of the Invention

The present invention relates to an improved data processing system and method for coordinating the operation of multiple computing devices, and in particular, to a method and system for initializing computers and other computing devices through a computer communications network.

2. Description of Related Art

A modern distributed computing environment in a moderate to large enterprise consists of many computing devices that communicate with each other through a computer communications network. There are two groups of devices, called clients and servers, which perform the computational tasks associated with the defined purposes, or missions, of the enterprise. Clients request centralized data processing services from servers when performing computational tasks. Servers supply those requested services. Generally, there are more clients than servers because servers are typically larger machines that can each service the requests of many clients.

Clients are usually operated by people who are end-users of the enterprise computing environment. Each end-user has a role in the enterprise which requires access to a subset of the computational tasks associated with the missions of the enterprise. End-users with different roles require access to different subsets of computational tasks. It is important that each end-user have rapid and easy access to the appropriate subset of computational tasks associated with that end-user's role. It is also important that each end-user not have access to computational tasks that are not associated with that end-user's role. By limiting end-user access in this way, end-users are prevented from causing inadvertent or deliberate damage to the enterprise computing environment.

Servers are operated by people who are administrators of the enterprise computing environment. Administrators have roles that assure that the enterprise computing environment is available to end-users with a minimum specified quality of service. The computational tasks associated with administrator roles are therefore associated with the availability of the enterprise computing environment and not necessarily directly associated with the missions of the enterprise. In addition to operating servers, administrators are responsible for the installation, configuration and maintenance of the entire enterprise computing environment, including servers, networks, and clients. An important responsibility of administrators is to define the software configuration of each client so that it matches the access requirements of the end-user who is operating the client.

The integration of clients and servers into distributed computing environments has provided benefits to enterprises by making data more available when and where it is needed. The productivity of end-users has been increased by significantly reducing manual handling and processing of data that is required to make the data useful to the enterprise. Moreover, client-server environments have made it possible to use this data as a tool to improve strategic decision making, and it has permitted enterprises to take advantage of the decreasing unit cost of computing by distributing data processing to newer devices.

The increasing complexity of distributed computing environments has also increased the costs of administering these environments. These increasing administrative costs offset the benefits described above. In fact, as the unit cost of computing devices has decreased, these administrative costs are responsible for an increasing proportion of the total cost of ownership of data processing resources. This has made these administrative costs a target for increasing cost-containment efforts by enterprises. End-user client devices contribute a significant and increasing share of these administrative costs because they are the most numerous, most functionally diverse, most physically scattered, and most vulnerable of the computing resources.

The concept of the server-managed client has been introduced as a means of controlling the administrative costs of these clients. The implementation of this concept permits administrators to define the client software environment using resources available on centrally located servers rather than having to physically visit and configure each client separately. These server resources include files that are stored on servers and that are copied through the network by clients. These transferred files include program files that contain the client software instructions that execute on the client and data files which define the enterprise computing environment for that client software. These server resources also include administrative software running on servers to automate the creation and management of client software environment definitions.

The implementation of server-managed clients is made possible with a remote boot process that is provided to the client. A boot process on a client is defined as a sequence of program instructions that begins automatically when the client is started or reset and completes when an end-user software environment is operational on the client. The initial instructions that are executed in a boot process are fixed in the nonvolatile memory of the hardware of the client. As the boot process progresses, program instructions are located on a source outside of the client's nonvolatile memory and copied into the client's volatile memory (also referred to as dynamic or random access memory). Client execution is then transferred from nonvolatile memory to these instructions in volatile memory. Those instructions in volatile memory continue the boot process by locating and copying additional program instructions and data into the client until the end-user software environment is operational.

In a remote boot process (also called a network boot process) some or all of the program instructions and data are copied to the client's volatile memory by requesting and receiving files from a specified server, called a boot server, over a network through the client's network interface device. This is distinguished from a local boot process where the source of the program instructions and data is nonvolatile medium residing in a device that is attached to the client, such as a diskette, hard disk, or CD-ROM. A remote boot process allows end-user software environments to be located in a repository on a centrally-located boot server instead of having to be transported on a separate physical media to the location of every client.

The server-managed client concept has administrative benefits that go well beyond those associated with the initial deployment of a client. Updates, fixes, or changes to client operating systems and application programs can be applied to the client files where they are stored on the servers. Those changes can then be deployed to all clients automatically using the remote boot process with no administrator or end-user intervention required except to initiate the remote boot by restarting or resetting each client. By assuring the consistency of the client machine software environments in this manner, the incidence and impact of software-related problems is reduced, thereby reducing the cost and complexity of diagnosing and rectifying client-side problems.

Multiple client operating systems can be supported to meet application needs, end-user preferences, or hardware compatibility issues. Access to a client machine's local hard drive can be restricted to force all end-user generated data to be stored on a server, ensuring that such critical enterprise data is always available. End-user authentication and authorization processes can be centralized and simplified.

Separate classes of client desktop interfaces can be deployed for each class of end-user, or an administrator can have the ability to define customized desktop environments, including a set of specific authorized applications for each end-user in a domain. More dynamically, end-users can have "roaming" desktops. When an end-user logs on to a client machine, the end-user's desktop and applications are supplied from the server, giving the end-user the ability to log on to any client machine in the domain and see the same desktop and applications. This capability is particularly useful in environments in which end-users do not always work at an assigned workstation but move between workstations based on availability, such as call centers, banks, or airline departure gates.

The server-managed client architecture also increases the reliance of clients upon the boot server for their ability to operate. By extension, the mission-critical computational tasks of the enterprise are also more reliant upon having the boot server maintain a minimum quality of service. For instance, during failure recovery after a power failure or some other type of widespread system outage, a large number of clients will need to be remote booted almost simultaneously. In some environments, the distributed computing environment needs to assure that the clients can complete the remote boot process within a specified time constraint, thereby imposing both availability and performance constraints on the remote boot infrastructure. A fault-tolerant, performance-sensitive solution would ensure that the clients can complete the remote boot process with a minimum required quality of service over a wide range of operating conditions within the remote boot infrastructure.

Therefore, it would be advantageous to provide a method and system for a fault-tolerant remote boot solution that can dynamically respond to changes in the quality of service provided by each of multiple redundant boot servers. It would be particularly advantageous for the method and system to throttle off responses that could direct clients to boot servers that have failed or that currently have low or unacceptable qualities of service. It would also be advantageous to avoid severe client boot fault conditions that could arise from interrupting the remote boot of any client that had already been directed to a boot server.

SUMMARY OF THE INVENTION

A method, a system, an apparatus, and a computer program product are presented for facilitating a remote boot process between clients and alternate available boot servers on a network. Each boot server is able to respond to a boot request message from any client on the network by sending a boot response message to that client. That boot response message identifies the boot server from which it originates and directs the client to complete the remote boot process by requesting all boot files from that same boot server. The client selects any one of the received boot response messages and completes its remote boot from the same boot server identified in that boot response message. Each boot server employs a self-throttling process which periodically monitors its own current processing load and the processing load of the other alternate boot servers. This process determines whether the boot server is currently capable of processing the remote boot of additional clients with the required quality of service. The boot server will respond to boot request messages received from clients only if it is currently capable of the additional processing load required to remote boot those clients as specified. If the boot server is not capable of managing that additional processing load, then it will not respond to boot request messages from clients. This automatically causes the client devices to select another boot server from among the boot response messages that they do receive. The receipt of those boot response messages would indicate that the boot servers which sent them are currently capable of remote booting the client with the required quality of service.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

Figure 1A:
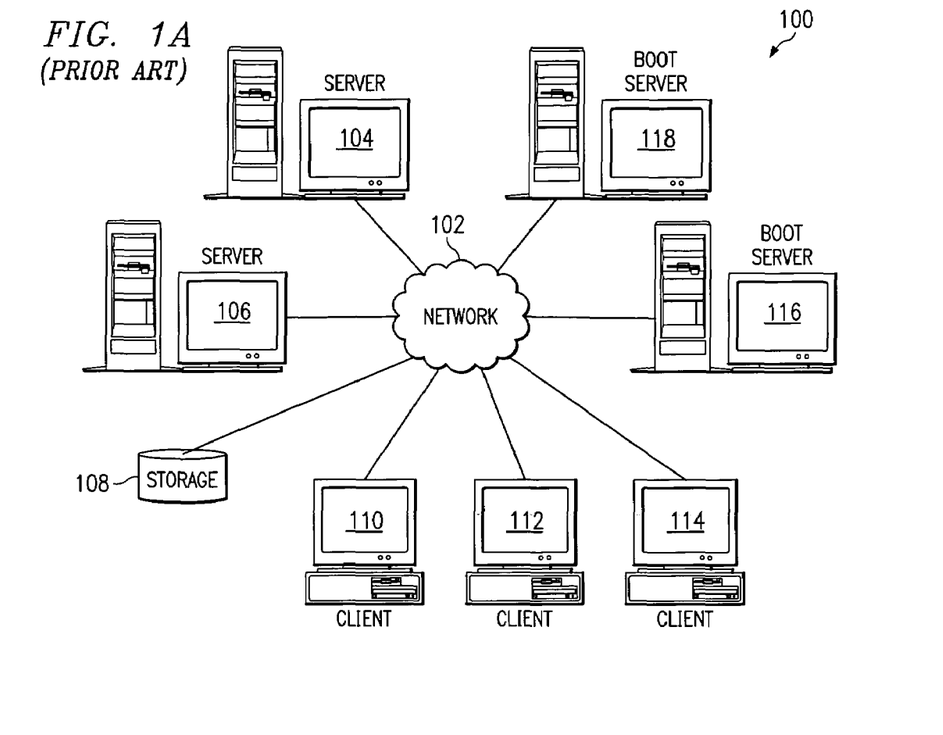
FIG. 1A depicts a typical distributed data processing system in which the present invention may be implemented.

With reference now to the figures, FIG. 1A depicts a typical network of data processing systems. Distributed data processing system 100 contains network 102, which is a medium that may be used to provide communications links between various devices and computers connected together within distributed data processing system 100. Network 102 may include permanent connections, such as wire or fiber optic cables, or temporary connections made through telephone or wireless communications. In the depicted example, application server 104 and application server 106 are connected to network 102 along with storage unit 108. In addition, clients 110-114 also are connected to network 102. Clients 110-114 can employ boot servers 116 and 118 to receive operating system files and/or application files.

The present invention could be implemented on a variety of hardware platforms; FIG. 1A is intended as an example of a heterogeneous computing environment and not as an architectural limitation for the present invention. Data processing systems connected to the network may be represented by a variety of computing devices, such as mainframes, personal computers, personal digital assistants (PDAs), etc. Distributed data processing system 100 may include additional servers, clients, routers, and other devices that are not shown.

Figure 1B:
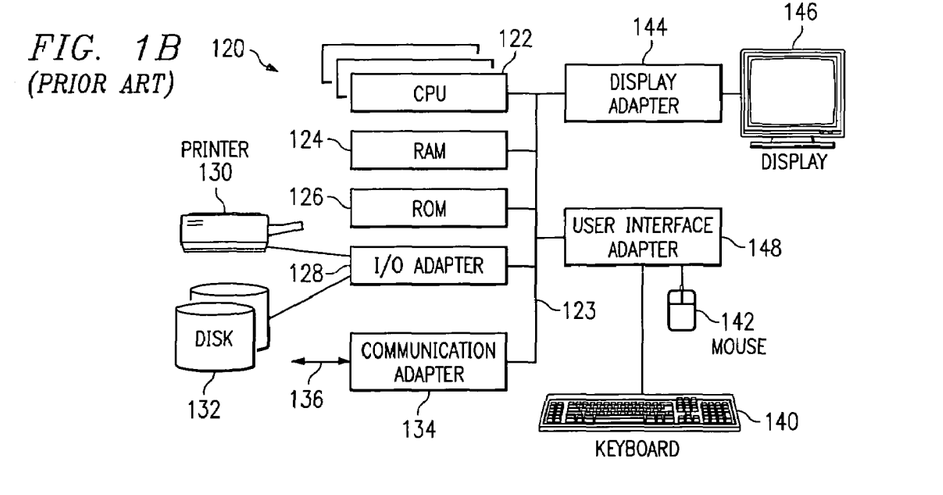
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A. Data processing system 120 contains one or more central processing units (CPUs) 122 connected to internal system bus 123, which interconnects random access memory (RAM) 124, read-only memory (ROM) 126, and input/output adapter 128, which supports various I/O devices, such as printer 130, disk units 132, or other devices not shown, such as a sound system, etc. System bus 123 also connects communication adapter 134 that provides access to communication link 136. Communication adapter 134 may include a network interface card (NIC), and system 120 may be PXE-enabled by including the appropriate functionality within an option ROM on the NIC or within some other system ROM. User interface adapter 148 connects various user devices, such as keyboard 140 and mouse 142, or other devices not shown, such as a stylus, microphone, etc. Display adapter 144 connects system bus 123 to display device 146.

Those of ordinary skill in the art will appreciate that the hardware in FIG. 1B may vary depending on the system implementation. For example, the system may have one or more processors and multiple types of nonvolatile memory. Other peripheral devices may be used in addition to or in place of the hardware depicted in FIG. 1B. In other words, one of ordinary skill in the art would not expect to find similar components or architectures within a network-enabled phone and a desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a Microsoft® Windows® operating system environment.

The present invention may be implemented on a variety of hardware and software platforms, as described above. More specifically, though, the present invention is directed to providing a fault-tolerant, self-throttling, remote boot methodology. As background, a typical remote boot methodology is described before describing the present invention in more detail.

With reference now to FIGS. 2A-2D, a set of figures describes the standard PXE remote boot methodology. The description of FIGS. 2A-2D is adapted from *Preboot Execution Environment (PXE) Specification, Version* 2.1, Intel Corp., 09/1999, which provides a complete description of the PXE protocol. PXE is a remote boot protocol that relies upon a set of industry-standard, Internet-related protocols, such as TCP/IP (Transport Control Protocol/Internet Protocol), DHCP (Dynamic Host Configuration Protocol), and TFTP (Trivial File Transfer Protocol). PXE extends DHCP by using the option fields within DHCP-formatted packets to transfer PXE-related information. By using standard protocols, an enterprise is able to use its existing TCP/IP network infrastructure with the DHCP protocol to implement remote boot capabilities.

Figure 2A:
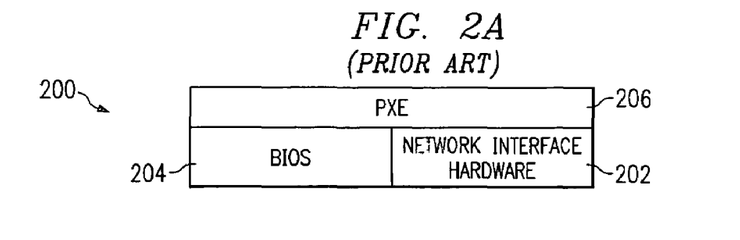
FIGS. 2A-2D are a set of figures that are used to describe the standard PXE remote boot methodology.

Referring to FIG. 2A, a block diagram describes PXE-enabled client 200. Network interface hardware 202 must be present within the client device to communicate with other devices across a network. The client also contains BIOS (Basic Input/Output System) 204, usually in the form of a ROM, that allows the client to perform the initial steps of a boot process, such as a Power On Self-Test (POST) that initializes the client hardware. Client 200 also contains PXE functionality 206, which is usually contained within another ROM. It should be noted that the present invention (described in more detail below after the description of the standard PXE protocol) is limited to changes on the server-side of the PXE protocol and does not require modification to the PXE functionality within the client.

PXE specifies the protocols by which a client requests and downloads an executable image from a boot server. PXE does not specify the operational details and functionality of the network bootstrap program (NBP) that the client receives from the server, i.e. the remote boot image downloaded by the PXE client via TFTP or MTFTP (Multicast TFTP). In general, the execution of the downloaded NBP initiates a series of processing steps on the client that ultimately will result in the client being ready for use by its user. Typically, the NBP will use an application program interface (API) specified by PXE and provided by the client PXE support to request and install additional files via M/TFTP from the boot server containing executable images of an operating system, appropriate communications and other device drivers, and other system software. The NBP will then transfer client execution to the operating system which can use either PXE or its own communications support to request user-specific configuration information and application software executable images from the boot server for installation on the client.

The initial phase of the PXE client-server protocol uses a subset of the DHCP protocol messages to enable the client to discover a boot server, i.e. a server that delivers executables for booting the client. The client may use the opportunity to obtain an IP address, which is the expected behavior but is not required. A standard DHCP service provides communications-related configuration values to client computers on a network during the client boot process; the primary configuration value that the client might receive is a dynamically allocated IP address. The second phase of the protocol occurs between the client and a boot server and uses the DHCP message format as a convenient format for communication, so the second phase is otherwise unrelated to the standard DHCP services.

Hence, the PXE protocol is a combination of an extension of DHCP (through the use of several DHCP Option tags) and the definition of simple packet transactions that use the DHCP packet format and options to pass additional information between the client and the server. In this manner, the functionality of existing DHCP services is not disturbed by the operation of the PXE protocol.

In the PXE protocol, DHCP option fields are used to perform the following: (a) distinguish between DHCPDISCOVER and DHCPREQUEST packets sent by a client as part of this extended protocol from other packets that the DHCP server or boot server might receive; (b) distinguish between DHCPOFFER and DHCPACK packets sent by a DHCP or Proxy DHCP server as part of this extended protocol from other packets that the client may receive; (c) convey the client system's ID (in most cases, the client's UUID--Universally Unique Identifier) to the DHCP and boot server; (d) convey the client system's architecture type to the DHCP server and boot server; and (e) convey the boot server type from which the client is requesting a response. Based on any or all of the client network adapter type, system architecture type, and client system ID, the boot server returns to the client the file name (on the server) of an appropriate NBP executable. The client downloads the specified NBP executable into memory and then executes it.

As noted above, the functionality within the downloaded NBP is not specified by the PXE protocol.

In summary, the PXE protocol operates as follows. The client initiates the protocol by broadcasting a DHCPDISCOVER containing an extension that identifies the request as coming from a client that implements the PXE protocol. Assuming that a DHCP server or a proxy DHCP server implementing this extended protocol is available, after several intermediate steps, the server sends the client a list of appropriate boot servers. The client then discovers a boot server of the type selected and receives the name of an NBP executable file on the chosen boot server. The client uses TFTP to download the NBP executable from the boot server and then initiates the execution of the downloaded NBP image.

As should be apparent from the description above, the server-side functionality of the client-server interaction must provide both standard DHCP functionality and redirection of the client to an appropriate boot server. Each PXE-enabled boot server must then have one or more executables appropriate to the clients that it serves. The redirection of the client is generally performed in two ways: (1) by implementing a combined service with standard DHCP functionality and redirection functionality; or (2) by implementing both a standard DHCP service with standard DHCP functionality and a separate redirection service with only redirection functionality. In the first case, the DHCP servers that are supplying IP addresses to clients are modified to become (or are replaced by) servers that provide IP addresses for all clients within a network while also redirecting PXE-enabled clients to boot servers as requested. In the second case, PXE redirection servers called "Proxy DHCP servers" are added to the existing network environment; these servers respond only to PXE-enabled clients and provide only redirection to boot servers. Examples of both of these methodologies are provided below.

Figure 2B:
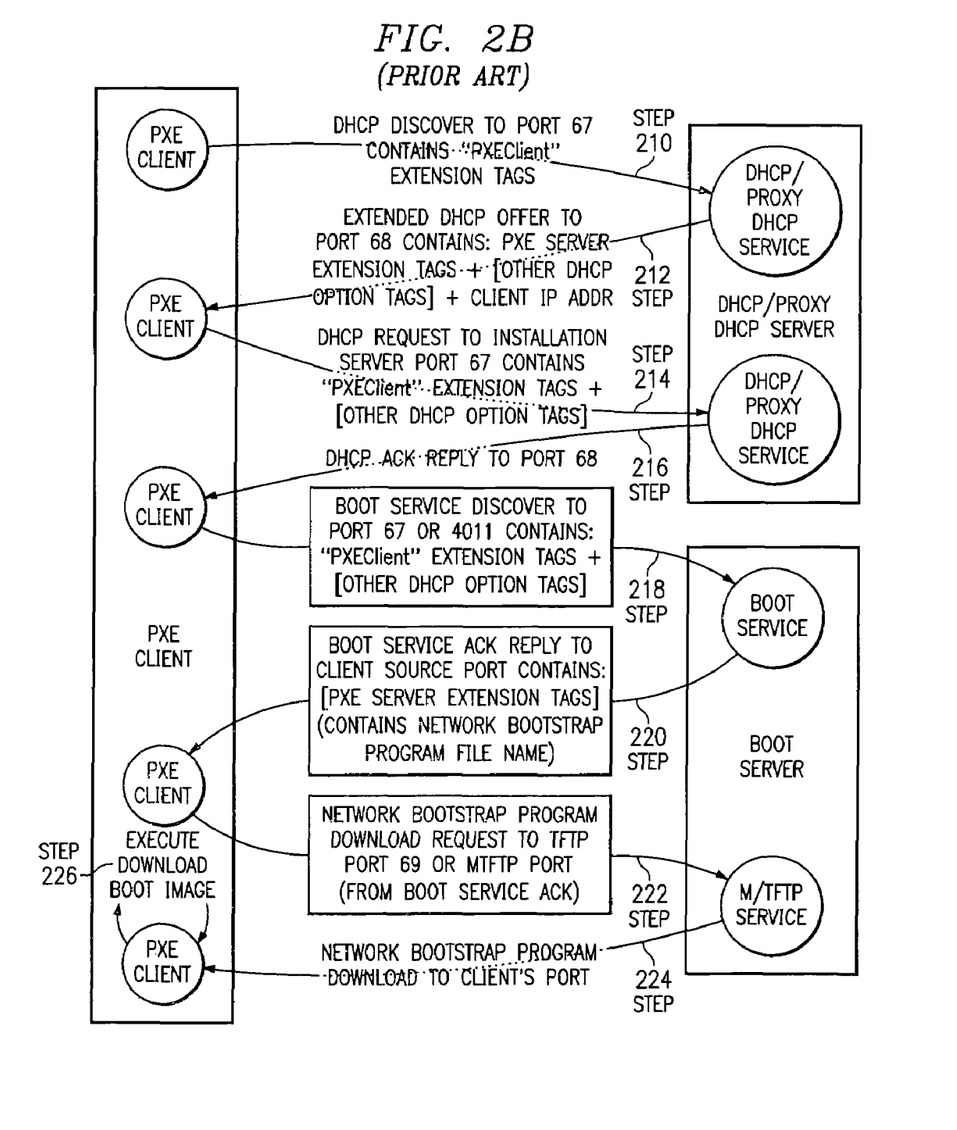

Referring to FIG. 2B, a data flow diagram shows the messages that are passed between a PXE-enabled client and a combined DHCP/Proxy DHCP server and a boot server. The remote boot process begins with the client broadcasting a DHCPDISCOVER message to the standard DHCP port 67 (step 210). An option field in this packet contains: a tag for the client identifier (UUID); a tag for the client UNDI (Universal Network Device Interface) version; a tag for the client system architecture; a DHCP option 60, Class ID, set to "PXEClient:Arch:xxxxx:UNDI:yyyzzz".

The DHCP or Proxy DHCP service responds by sending a DHCPOFFER message to the client on the standard DHCP reply port 68 (step 212). If a Proxy DHCP service is responding, then the client IP address field is null (0.0.0.0). If a DHCP service is responding, then the returned client IP address field contains a valid IP address. It should be noted that other DHCP services could respond with DHCP offers such that the client receives multiple offers. The DHCPOFFER contains, among other data items, a client IP address and a boot server list in the Boot Server field in the PXE tags of the DHCPOFFER.

Assuming that the client selects an IP address offered by a DHCP service, it then completes the standard DHCP protocol by sending a request (DHCPREQUEST) for the selected address back to the DHCP service (step 214) and waiting for an acknowledgment (DHCPACK) from the service (step 216).

The client then selects and discovers a boot server by sending a boot service discovery message (step 218) in the appropriate manner as specified in the discovery control options included in the previous DHCPOFFER containing the PXE service extension tags (using port 67 if broadcast or port 4011 if either multicast or unicast). The boot server unicasts a DHCPACK packet back to the client on the client source port (step 220). The reply packet contains the name of the boot file that the client needs to download.

The client initiates the download of the executable NBP file using either TFTP or MTFTP (step 222); the file to be downloaded and the placement of the downloaded code within memory is dependent on the client's hardware architecture, its operating system, etc. After the boot server has provided the NBP (step 224), the client can initiate the execution of the NBP (step 226).

Figure 2C:
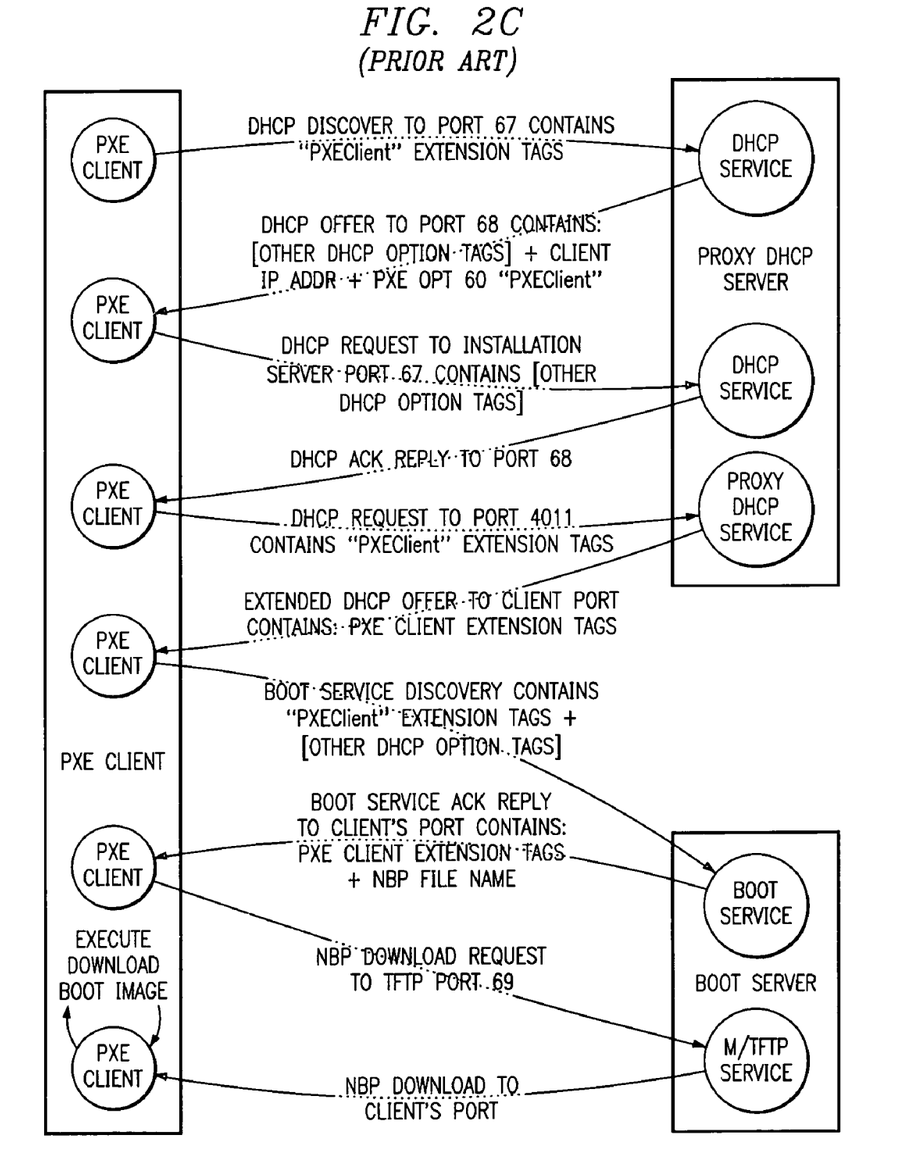

FIG. 2B depicts an implementation of the PXE protocol in which the standard DHCP service has been modified to include the Proxy DHCP service for redirecting the client to the boot server. In contrast, FIG. 2C shows an alternative implementation of the PXE protocol in which the standard DHCP service is maintained while a Proxy DHCP service is added that supplies the PXE DHCP options. The Proxy DHCP service may reside on the same server machine as the DHCP service, or it may be located on a separate server; FIG. 2C shows the Proxy DHCP service implemented on the same server as the DHCP service. In this case, the Proxy DHCP service is listening to UDP port 4011, and communication with the Proxy DHCP service occurs after completing the standard DHCP protocol. The Proxy DHCP uses port 4011 because it cannot share port 67 with the DHCP service on the same machine. The PXE client knows to interrogate the Proxy DHCP service because the DHCPOFFER from the DHCP service contains an Option #60 "PXEClient" tag without corresponding Option #43 tags or a boot file name that the client requires to complete the PXE boot process.

Figure 2D:
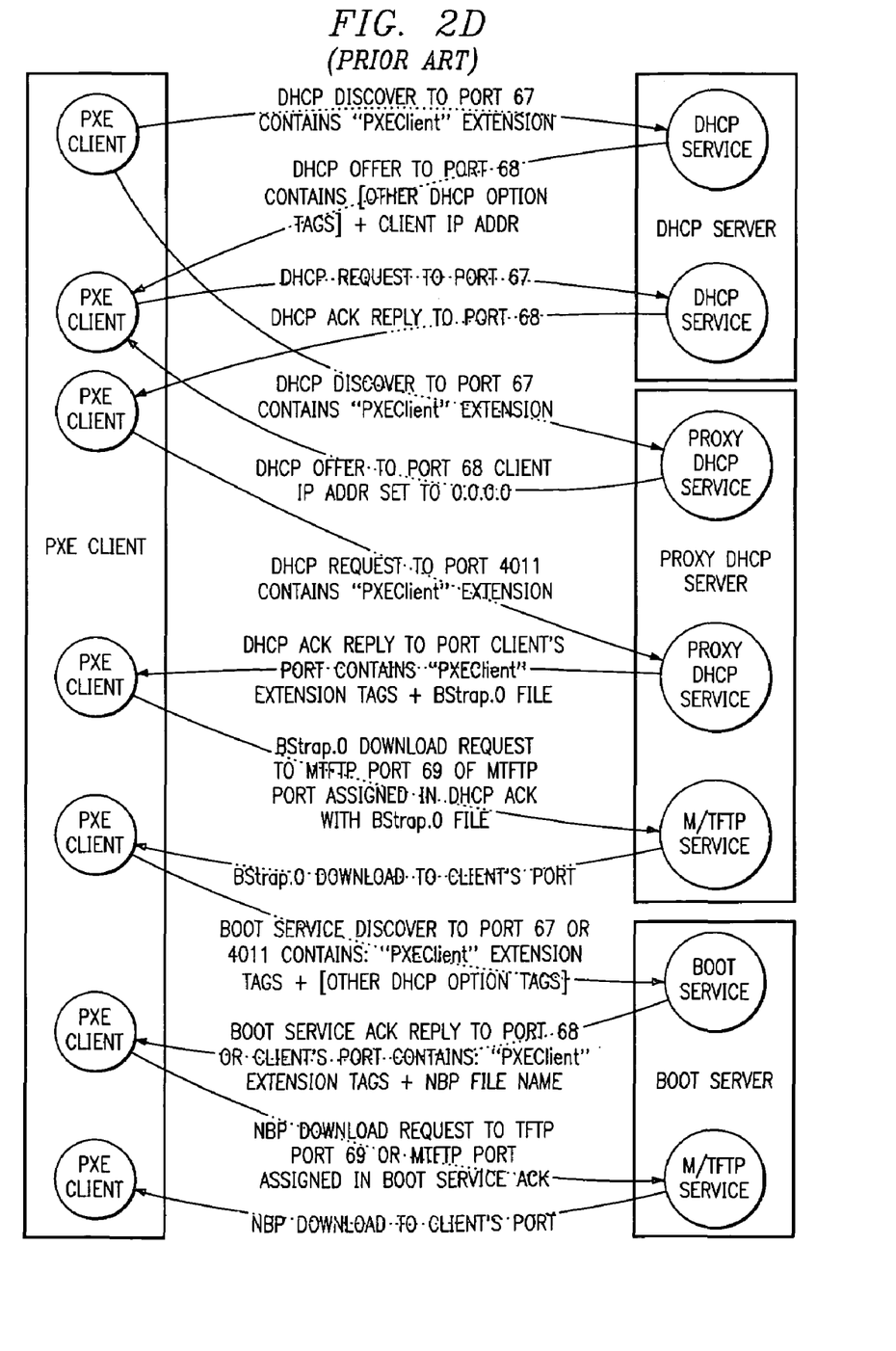

In contrast to FIG. 2B and FIG. 2C, FIG. 2D depicts an implementation of a Proxy DHCP service on a server separate from the DHCP service. In this case, since the services are implemented on different machines, the Proxy DHCP service can listen on UDP port 67 and responds in parallel with the DHCP service.

Turning to remote boot processes in general, as noted previously, a server-managed client architecture increases the reliance of clients upon the boot server for their ability to operate. By extension, the mission-critical computational tasks of the enterprise are also more reliant upon having the boot server maintain a minimum quality of service. For instance, during failure recovery after a power failure or some other type of widespread system outage, a large number of clients will need to be remote booted almost simultaneously.

It would be desirable in some distributed computing environments to assure that the clients can complete the remote boot process within a specified time constraint, thereby imposing both availability and performance constraints on the remote boot infrastructure. The present invention is directed to a fault-tolerant, performance-sensitive solution that ensures that the clients can complete the remote boot process with a minimum required quality of service over a wide range of operating conditions within the remote boot infrastructure.

A partial solution includes the provision of a sufficient number of redundant boot servers in the remote boot infrastructure so that no one boot server can be a single point of failure and so that a minimum quality of service for the remote boot can be maintained for all clients over a foreseeable range of operating conditions. However, simply deploying multiple boot servers would not solve many other problems that might appear during remote boot operations. For instance, it would be advantageous for the remote boot infrastructure to assure that a client can always locate a boot server that can provide its specific required software environment with at least a minimum specified quality of service.

Hence, part of the solution would assure that any boot server that responds to a boot request from a client is able to supply that client's specific software environment. This requires an administrative process which assures that a software environment definition that is created or changed for a client on any boot server is copied to all boot servers. This process does not require compliance with the remote boot processes of clients and can be implemented entirely within the administrative control of the server environment; this administrative process is not further discussed herein.

More importantly, the present invention assures that a client receives a remote boot response from a boot server if, and only if, that boot server can service the remote boot of the client with the required quality of service. This assures that the client will select an appropriate boot server to complete the remote boot process. This part of the solution entails compliance with the remote boot environments that are implemented as instructions in the nonvolatile memory of clients. Administrators are not likely to have control of these client remote boot environments because they are provided as hardware or firmware by vendors of network interfaces for client machines. Hence, the present invention is compatible with standard client remote boot environments.

The Preboot Execution Environment (PXE) specification in the Intel® Wired for Management (WfM) initiative, previously discussed in more detail above, is a standard client remote boot environment that has gained wide acceptance among vendors of client network interfaces that support Internet Protocol (IP) networks. IP networks have become very common in distributed enterprise computing environments because IP is an open, rather than proprietary, protocol that is implemented on both local area networks (LANs) and wide area networks (WANs). IP is also supported by a large number of computer communications devices.

A client that supports PXE initiates the remote boot process by broadcasting a packet with a format defined by IP's Dynamic Host Configuration Protocol (DHCP). This packet contains a unique identifier of the client, and the packet indicates that the client needs to be assigned an IP address so that it can communicate directly with other devices on the network. This packet also indicates that the client implements PXE and needs to be directed to a boot server to complete a remote boot.

The fact that a PXE client broadcasts this initial request packet has advantages in a network where redundant boot servers are deployed. The client does not need to be initially aware of how many boot servers are deployed or where they are located. All boot servers receive this initial broadcast request packet as long as they are attached to a part of the network that is configured by an administrator to forward the transmission of DHCP broadcast packets from the client. Any of those boot servers can respond to this initial broadcast request packet provided that a DHCP server service is running on the boot server and that the DHCP server service is configured by an administrator so that it is authorized to respond to the client. The DHCP server service on each boot server can be configured by an administrator so that the response directs the client back to the same boot server to complete its remote boot. The PXE support in the client waits briefly so that it can receive one or more boot server responses and then chooses a response which directs it to a boot server to complete its remote boot.

A disadvantage to the standard PXE remote boot method described above is the static nature of the configuration of the PXE support on the client and of the configurations of the DHCP server services and other remote boot support services on the boot servers. These typical configurations cannot be changed dynamically in response to changing boot server quality of service conditions. For example, it is possible for the DHCP server service on a boot server to continue to operate and send responses that direct clients to that same boot server even though other services on the boot server that are required to complete the remote boot of clients have failed or have had their quality of service degraded below an acceptable level by severe server processing loads.

The latest revisions of the PXE specification permit a single response from a DHCP server service to indicate multiple alternate boot servers, but this list is also static and cannot dynamically exclude boot servers that cannot currently provide an acceptable quality of service. It is possible for this list to be provided on a client display to an end-user for boot server selection, but an end-user is unlikely to be sufficiently aware of boot server conditions to be able to make an informed choice.

Hence, the present invention provides a method and system for a fault-tolerant remote boot solution that can dynamically respond to changes in the quality of service provided by each of multiple redundant boot servers. The present invention throttles off responses that could direct clients to boot servers that have failed or that currently have low or unacceptable qualities of service. In addition, the present invention avoids severe client boot fault conditions that could arise from interrupting the remote boot of any client that had already been directed to a boot server.

As should be apparent from the description of FIGS. 2A-2D above, the PXE protocol specifies that the client and the server must perform certain operations in certain sequences yet allows wide discretion in the manner in which the server-side operation can be implemented. The present invention exploits this flexibility by implementing a different configuration for the DHCP service, the Proxy DHCP service, and the boot server. In the present invention, the DHCP service and the Proxy DHCP service are implemented on separate server machines, which is similar to the implementation shown in FIG. 2D, but the Proxy DHCP service is implemented on the same server as the boot service. To avoid confusion between the different implementations and to denote the novelty of the manner in which the PXE-compatible server-side operations are performed by the present invention, the following description substitutes the typical "Proxy DHCP service" terminology with the term "PXE proxy service" while describing the present invention.

In the present invention, a PXE Proxy service is installed on all boot servers. The PXE Proxy service is a server that provides only the PXE remote boot information to the client machines while the actual client IP address is obtained from a standard DHCP server.

In prior art implementations of the PXE protocol, a Proxy DHCP service could supply a list of one or more boot servers in the DHCPOFFER. In contrast, in the present invention, each PXE Proxy service is configured to "redirect" the client to the boot service on the same server machine on which the responding PXE Proxy service is executing. In other words, the Boot Server list in the DHCPOFFER contains a single boot server; each PXE Proxy service is configured to point to its own machine as the boot server. In order to do so, any one of the multiple boot servers on the network must be capable of servicing a client request to act as its boot server.

Figure 3:
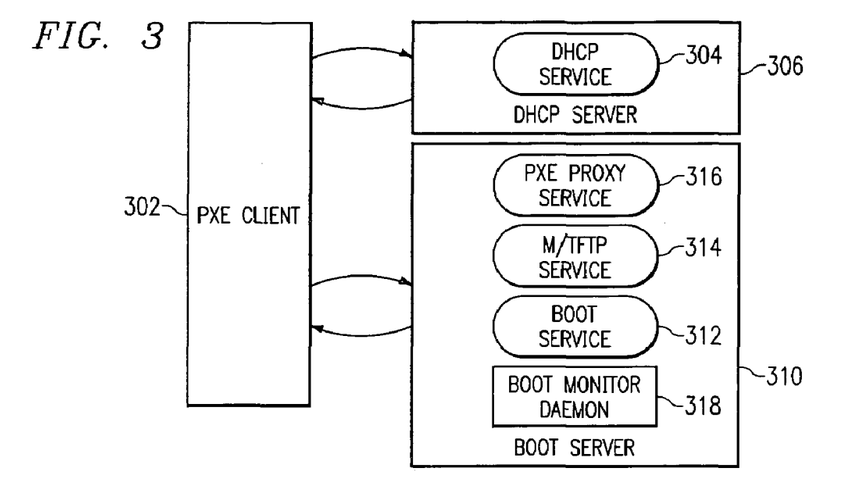
FIG. 3 is a block diagram depicting a client-server configuration for implementing the PXE protocol in accordance with a preferred embodiment of the present invention.

With reference now to FIG. 3, a block diagram depicts a client-server configuration for implementing the PXE protocol in accordance with a preferred embodiment of the present invention. PXE client 302 needs to perform a remote boot operation; as noted previously, the present invention does not require any changes to the standard client-side operations of the PXE protocol. DHCP service 304 executes upon a dedicated DHCP server 306, in a manner similar to that shown in FIG. 2D.

In the present invention, however, boot server 310 supports not only boot service 312 and M/TFTP service 214 but also PXE Proxy service 316. Rather than "redirecting" the client to another server machine on which the client would find a boot service, i.e. to a boot server, as described with respect to FIGS. 2B-2D, the client is "redirected" to the same server machine. PXE Proxy service 316 directs the client to request boot files from the same machine on which PXE Proxy service 316 executes. Since each boot server has the required files necessary to remote boot each client, a client can be successfully booted from the boot server chosen by the client from among any of the boot servers that responded to the client's request.

With this system architecture, the present invention also provides a self-throttling feature. To facilitate load balancing among boot servers, a server process called a "Boot Monitor" daemon 318 executes on each boot server and monitors the server load using an appropriate server load algorithm to determine whether or not the boot server can adequately service additional client boot requests, i.e. whether or not the boot server has sufficient resources for servicing additional boot requests. For example, the server load algorithm could consider several factors within the boot server: the total number of current remote boot requests that are already being serviced by the daemon's boot server; the expected remaining duration of each remote boot request that is already being serviced; the estimated server load, e.g., in terms of CPU usage and memory utilization, to remote boot different types of client operating systems; the current trends of CPU usage and memory utilization within the boot server; and/or other factors. Based on this information, the Boot Monitor daemon computes threshold limits that determine whether or not new client boot requests should be accepted and serviced. When an upper threshold is reached, the Boot Monitor daemon stops or suspends the PXE Proxy service on the boot server in order to prevent the boot server from responding to additional boot requests. When the boot server's load drops below the lower threshold, the Boot Monitor daemon restarts the PXE Proxy service to accept new boot requests.

In an alternative embodiment, the Boot Monitor daemons on the plurality of boot servers also communicate load statistics amongst themselves. In this embodiment, in addition to computing an absolute availability for the local boot server using an appropriate set of factors derived from within the local boot server, the server load algorithm could also incorporate a comparison of the local server load with the server loads of the other boot servers in order to compute a relative availability for the local server. Again, the algorithm for determining the absolute availability of the local boot server and the relative availability of the local boot server versus other boot servers can vary depending upon certain implementation-dependent factors that are appropriate to the system, such as positional dispersion of boot servers compared to the location of the client.

Figure 4:
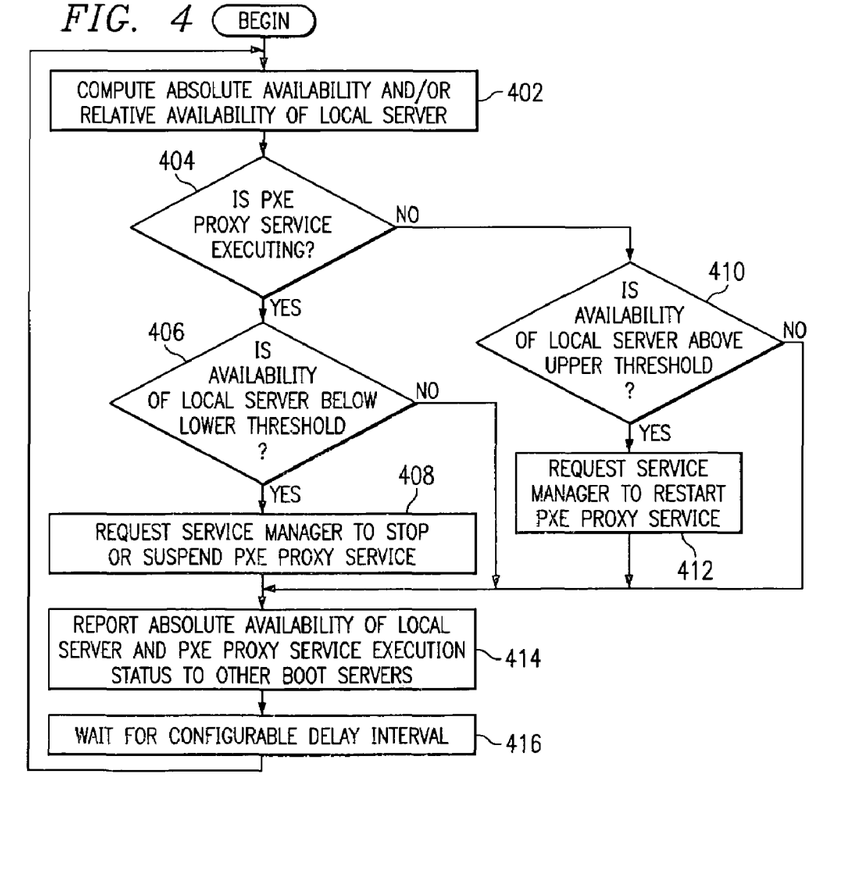
FIG. 4 is a flowchart depicting a method to be used by a Boot Monitor daemon in accordance with a preferred embodiment of the present invention.

With reference now to FIG. 4, a flowchart depicts a method to be used by the Boot Monitor daemon in accordance with a preferred embodiment of the present invention. Although it is assumed that the Boot Monitor daemon is not halted, an appropriate mechanism may be implemented for terminating the daemon if necessary.

The process begins by computing the absolute availability and/or relative availability of the local server, i.e. the boot server on which the Boot Monitor daemon is executing (step 402). In other words, a determination is made as to the availability of the local server for booting additional clients and the availability of other servers that have reported that they are booting additional clients. A determination is then made as to whether or not the PXE Proxy service is currently executing (step 404). If so, then the process branches to step 406, and if not, then the process branches to step 408.

If the PXE Proxy service is executing, then a determination is made about whether or not the availability of the local server (absolute availability and/or relative availability) is below a lower threshold (step 406). If not, then the process branches to step 414. If the availability is below the lower threshold, then the Boot Monitor daemon requests the service manager to stop or suspend the PXE Proxy service (step 408). The manner in which the PXE Proxy service is suspended may vary depending upon several factors, such as the operating system of the local server.

If the PXE Proxy service was determined not to be executing at step 404, then a determination is made as to whether or not the availability of the local server (absolute availability and/or relative availability) is above an upper threshold (step 410). If not, then the process branches to step 414. If the availability is above the upper threshold, then the Boot Monitor daemon requests the service manager to restart the PXE Proxy service (step 412).

After either halting or restarting the PXE Proxy service in the appropriate manner, then the Boot Monitor daemon of the local server reports the absolute availability of the local server and the PXE Proxy execution status to other boot servers on the network (step 414). The boot server may then wait for a configurable delay interval before resuming the process (step 416). In this manner, the Boot Monitor daemon performs a self-throttling process to regulate whether the boot server should accept a boot request from a client. In addition, if desired, the Boot Monitor daemons of the various boot servers can coordinate their actions to balance the load amongst the boot servers.

Assuming that the present invention is implemented within the PXE specification, it can be seen that the present invention could not be implemented with the architectures shown in FIG. 2B or FIG. 2C. In the present invention, the standard DHCP service that offers IP network addresses to clients must run on a separate server machine than any of the PXE proxy services. The standard DHCP service process should be continually available and should not be stopped and started in the manner described for the PXE proxy service process. Hence, the DHCP service (for offering an IP address) could not be combined with the PXE Proxy service (for indicating the network address of a boot server) within a single process on the same server. Moreover, the DHCP service and the PXE Proxy service should not be provided by separate processes executing on the same server machine because this would cause PXE clients to communicate only with the PXE Proxy service on the same server as the DHCP service, thereby ignoring the PXE Proxy services on other servers and negating the fault-tolerant and self-throttling features of the present invention.

The advantages of the present invention should be apparent in view of the detailed description of the invention that is provided above. When the client machine makes a boot request on the network, only the boot servers that have spare capacity to service the boot request will actually respond to the client. Boot servers that become unavailable or become overloaded will not respond, thereby preventing a client from attempting to boot from a boot server from which it cannot complete the remote boot process. In addition, since the files required by any client to perform its remote boot process are defined on every boot server, each client can be successfully booted from any of the boot servers that respond. This ensures that the client's remote boot request can be satisfied in a fault-tolerant manner with adequate performance.

An important feature of this invention is that the PXE Proxy service can operate as a service that can be started and stopped independently of the other services that support the remote booting of clients; the Boot Monitor daemon does not cause these other services to be stopped on a boot server when it requests that the PXE Proxy service be stopped. This permits the decision on a boot server about whether or not to remote boot a client to be atomic and assures that any client which has already received a response from a boot server can complete its remote boot if it selects that boot server, even if the boot server has been "throttled-off" so that it will not respond to new boot requests from other clients. If this could not be assured, so that a boot service on a boot server could be stopped after a client has committed its remote boot to that boot server, then it is possible for a "boot fault" to occur on a client such that it is unable to complete a remote boot that it started. Such a boot fault would be likely to occur at some intermediate state of the remote boot process, which would typically require unacceptable conditions for recovery, such as a client user or administrator intervention, or extremely complex and time consuming automated recovery procedures within the PXE support or the NBP on the client.

For this reason, the Boot Monitor daemon described in this invention should not be implemented as a separate process that starts and stops integrated remote boot service designs such as, for example, Microsoft Windows 2000® Remote Installation Service (RIS). The RIS service provides support for remote booting of a restricted DOS environment that can install an operating system onto a client hard drive. This RIS service also includes a Proxy DHCP service that is integrated on the same machine (i.e. the "Installation Server", which is similar to a boot server) as the BINL (Boot Image Negotiation Layer) Service (which is similar to the boot service) and the TFTP service. Stopping the RIS service in response to severe loading of the server may cause boot faults on clients if the BINL or TFTP service is stopped after the clients had already selected the boot server from among the PXE Proxy service responses that it had received. Although it might be possible for RIS to implement a Boot Monitor daemon as an internal process that would "throttle-off" only the PXE Proxy portion of the RIS service, the current RIS implementation does not make it dynamically sensitive to the current performance of the servers upon which it operates.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include storage type media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method within a server device for facilitating a remote boot process in a client device, wherein the client device and the server device reside on a network, the method comprising the steps of:

determining whether or not the server device is able to service an additional boot request;

receiving at the server device a boot request from the client device, wherein the server device is one of a plurality of boot servers on the network, and wherein the server device is able to respond to a boot request from any client device on the network;

responsive first to determining that the server device is able to service an additional boot request and second to receiving at the server device the boot request from the client device, sending a boot response to the client device, wherein the boot response directs the client device to download boot files from the server device; and employing a self-throttling process to prevent the server device from servicing an additional remote boot process for an additional client device if the server device has insufficient resources for servicing an additional remote boot process.

2. The method of claim 1 further comprising:

executing a proxy DHCP (Dynamic Host Configuration Protocol) service on the server device for processing the boot request, wherein the boot request is formatted as a PXE-extended (Preboot Execution Environment extended) DHCP Request message, and wherein the boot response is a PXE-extended DHCP Ack message.

3. The method of claim 1 further comprising:

executing a boot service on the server device for processing a PXE-extended Boot Service Discover message.

4. The method of claim 1, wherein the determining step is performed in each of the plurality of boot servers on the network.

5. The method of claim 1, further comprising:

responsive to determining that the server device is not able to service an additional boot request, suspending acceptance of additional boot requests from any client device on the network.

6. A method within a server device for facilitating a PXE-compliant (Preboot Execution Environment compliant) remote boot process in a client device, wherein the client device and the server device reside on a network, the method comprising the steps of:

determining whether the server device has sufficient resources to service a remote boot process for an additional client device;

receiving at the server device a PXE-extended DHCP (Dynamic Host Configuration Protocol) Request message from the client device, wherein the server device is one of a plurality of boot servers on the network, and wherein the server device is able to respond to a PXE-extended DHCP Request message from any client device on the network;

processing the received PXE-extended DHCP Request message within a Proxy DHCP service on the server device;

responsive first to determining that the server device has sufficient resources to service a remote boot process for an additional client device and second to processing the received PXE-extended DHCP Request message, sending from the server device a PXE-extended DHCP Ack message to the client device, wherein the PXE-extended DHCP Ack message directs the client device to download boot files from the server device; and employing a self-throttling process to prevent the server device from servicing an additional remote boot process for an additional client device if the server device has insufficient resources for servicing an additional remote boot process.

7. The method of claim 6 further comprising:

receiving at the server device a PXE-extended Boot Service Discover message from the client device;

processing the received PXE-extended Boot Service Discover message within a boot service on the server device; and sending from the server device a PXE-extended Boot Service Ack message to the client device.

8. The method of claim 7 further comprising:

receiving at the server device an NBP (Network Bootstrap Program) Download Request message from the client device;

processing the received NBP Download Request message within a TFTP (Trivial File Transfer Protocol) service on the server device; and downloading from the server device an NBP file to the client device.

9. The method of claim 6 further comprising:

executing a boot service daemon for monitoring an availability of the server device to adequately service additional remote boot processes.

10. The method of claim 9 further comprising:

computing the availability of the server device to adequately service an additional remote boot process based upon resources within the server device.

11. The method of claim 9 further comprising:

computing the availability of the server device to adequately service an additional remote boot process based upon resources within at least two boot servers in the plurality of boot servers on the network.

12. The method of claim 6 further comprising:

communicating an indication of available resources within the server device to at least one other boot server in the plurality of boot servers on the network.

13. The method of claim 6 further comprising:

stopping or suspending the Proxy DHCP service on the server device if the server device has insufficient resources for servicing an additional remote boot process.

14. The method of claim 6 further comprising:

restarting the Proxy DHCP service on the server device if the server device has sufficient resources for servicing an additional remote boot process.

15. The method of claim 6 further comprising:

communicating an execution status of the Proxy DHCP service on the server device to at least one other boot server in the plurality of boot servers on the network.

16. The method of claim 6, wherein the determining step is performed in each of the plurality of boot servers on the network.

* * * * *